United States Patent [19]
Lynne et al.

[11] Patent Number: 5,940,590
[45] Date of Patent: Aug. 17, 1999

[54] SYSTEM AND METHOD FOR SECURING COMPUTER-EXECUTABLE PROGRAM CODE USING TASK GATES

[75] Inventors: Kenton Jerome Lynne, Rochester; Dianne Elaine Richards, Kasson, both of Minn.

[73] Assignee: International Business Machines Corporation, Armonk, N.Y.

[21] Appl. No.: 08/866,956

[22] Filed: May 31, 1997

[51] Int. Cl.[6] .................................................. G06F 11/00
[52] U.S. Cl. ..................................... 395/186; 395/187.01
[58] Field of Search .............................. 395/186, 187.01, 395/188.01, 200.59; 380/4, 25, 30

[56] References Cited

U.S. PATENT DOCUMENTS

| | | | |
|---|---|---|---|
| 4,864,494 | 9/1989 | Kobus, Jr. ................................. | 395/186 |
| 5,305,456 | 4/1994 | Boitana ..................................... | 395/186 |
| 5,311,591 | 5/1994 | Fischer ........................................ | 380/4 |
| 5,412,717 | 5/1995 | Fischer ........................................ | 380/4 |
| 5,483,649 | 1/1996 | Kuznetsov et al. ...................... | 395/186 |
| 5,509,070 | 4/1996 | Schull ......................................... | 380/4 |
| 5,586,301 | 12/1996 | Fisherman et al. ...................... | 395/186 |
| 5,666,516 | 9/1997 | Combs ...................................... | 395/186 |

OTHER PUBLICATIONS

Magazine Review Launch Pad Franklin Tessler [1 page], Jan. 1995.

*Primary Examiner*—Robert W. Beausoliel, Jr.
*Assistant Examiner*—Pierre E. Elisca
*Attorney, Agent, or Firm*—Robert Kevin Perkins; Lawrence D. Maxwell

[57] ABSTRACT

A system, method and apparatus including a security-related computer-executable module, preferably embodied as software that operates in combination with a computer to secure arbitrarily located application program code. The system is capable of performing the method of inserting or placing at a location in a computer program defining a computer-executed task, security-related computer-executable information denominated as a task gate defining predetermined security conditions that must be meet to proceed past the task gate. The task gate is invoked when encountered during execution of the computer program. The gate is used to determine whether the predetermined security conditions have been met before allowing any further computer execution of the program.

19 Claims, 5 Drawing Sheets

SYSTEM AND METHOD FOR SECURING COMPUTER-EXECUTABLE PROGRAM CODE USING TASK GATES

BACKGROUND OF THE INVENTION

1. Field of the Invention

The present invention relates generally to security in a computing software environment, and more specifically to a computer-implemented technique for employing secure checkpoints referred to as task gates to secure access to computer-executable program code.

2. Description of the Related Art

Businesses are increasingly dependent on their computing resources or information systems. Company-sensitive information is typically stored in computer memory that is part of the information system. Security may be compromised if the information is accessed by unauthorized individuals. It may be accidentally or purposely destroyed or altered. Moreover, secret business information made available to competitors may be used to the owner's disadvantage causing economic loss and hardship. Additionally, certain resources such as a check-writing printer should be protected to prevent its fraudulent use.

Generally security for information systems is concerned with (1) confidentiality, (2) integrity, (3) accountability, and (4) availability. The first element confidentiality refers to the requirement that only uses authorized to certain information be able to access it. The second element integrity refers to the requirement that only authorized users be able to access information, and then only in certain ways. For example, one user may have rights to view and modify information, while another user has rights to view the same information but not to modify it. The next element accountability is concerned with making sure that users are accountable (i.e., identifiable and responsible) for their security-relevant actions. Finally, availability is concerned with making sure that no one can maliciously deny access to authorized users.

Typically the above-reference security measures are addressed on a resource or system level. A resource may be a file or a device with a computer system, whereas the system refers to an aggregation of components that may include software and/or hardware that together operate to perform computing functions for one or more users. An example of resource-level security follows. A file that is created by a user employing a word processing program may be given a password that must be provided in order to access the file. A computer or network system may require similar entry of a password in order to "login" or begin using the system after identifying oneself. The familiar notion of "logging in (login)" is a security concept, because not only must the individual meet some security requirement, such as the providing of a system-recognizable password, the user must identify him/herself to the system which makes the user accountable for any actions taken while logged in.

It is well known that certain users, perhaps belonging to certain groups, may be given rights to perform actions that others may not have. As described above, one user might have the right to access a file and modify it (i.e., write to the file), while another may access the file but may not modify it (i.e., only read the file). However, this is just one example of how one application, such as a word processing program or a local area network administration program, may handle security. Typically, application programs have very specialized security requirements that the underlying operating system must support. For example, an operating system may allow an entire database to be secured for read or write access, while a database management application may need to provide security controls on individual records that regulates who may read and who may write to a file. Additionally, such an application may contain special functions, such as database management functions, that should only be seen and used by authorized users.

To address the different security needs of different applications, most software applications have their own accompanying security setup routines that must be run by a system security administrator when the application is installed. Unfortunately, this requires the application to maintain a list or table of authorized users together with the tasks or functions that particular users may use. The list or table is checked whenever a user invokes an action that would cause the code associated with the task or function to be executed. It is cumbersome for the application developer to anticipate all of the authorized users or maintain such a list, or for an administrator to understand what each application does to understand how to protect it. Typically, when a user is removed or added to the system, the various security routines for each application must each be individually run.

Security is also a problem in "object oriented programming," which many software developers are moving to in order to reduce development expense. In object oriented programming, program code may be inherited from objects as long as there is an underlying system, sometimes embodied as a "framework" that supports the objects and allows the inheritance to take place. Frameworks take over many of the low-level functions such as communicating with the operating system, and allow applications to be created more quickly and with better quality for high-level functions since the low-level functions are taken care of by the frameworks designers. Unfortunately, applications frameworks designers have not provided any significant support for security-related needs of applications.

What is needed is a simple, low-cost, and efficient mechanism for implementing security-related checkpoints within an application that can be flexibly applied to various kinds of software applications. In an object oriented environment, such a mechanism is needed at the framework level, but which allows each application developer to determine when and where the framework-provided mechanism is applied relative to the application itself. Regardless of whether the mechanism is provided in an object-oriented environment or not, providing granularity of control that allows each application developer to decide when and where such a security-related mechanism is applied would be an advancement in the computer arts.

SUMMARY OF THE INVENTION

It is an objective of this invention to provide a simple, low-cost, and efficient security-related mechanism that may be flexibly applied in various types of software applications.

It is a further objective of this invention to provide such a mechanism that allows granularity of control within an individual application, such that an application developer may determine when and where the security-mechanism is applied.

It is a still further objective of this invention to provide a mechanism having the above advantages and which is suitable for providing security-related function in an object-oriented environment.

To meet the objectives described above, and to overcome the problems described above, and those which will become apparent upon reading the detailed description below, a new system and method capable of securing discrete and arbitrarily located application program code using computer-implemented information is provided. The system is capable of performing the method of inserting or placing at a location within a computer program defining a computer-executable task security-related computer-executable information referred to as a task gate defining security criteria that must be satisfied in order to execute the computer-executable task. The task gate may be invoked in response to encountering it during execution of the computer program. The encountered gate then determines whether the predetermined security conditions have been met before allowing execution the computer-executable task.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

The present invention is described in a preferred embodiment as being computer software. Nevertheless, in view of the teachings herein, it will occur to those skilled in the art that all or portions of the invention may be implemented in computer hardware or a combination of hardware and software (i.e., firmware).

Introductory Overview

The present invention includes logic, preferably implemented as computer software, that is referred to as a "task gate." The terminology "gate" connotes the utility of the special logic because it serves to shield or protect any other logic or software arranged in a predetermined relationship to the security-related gate task. A preferred embodiment is to provide the gate as computer-executable program code that proceeds a portion of application program code which is secured by the gate itself from unauthorized execution.

System for Implementing the Invention

Figure 1:
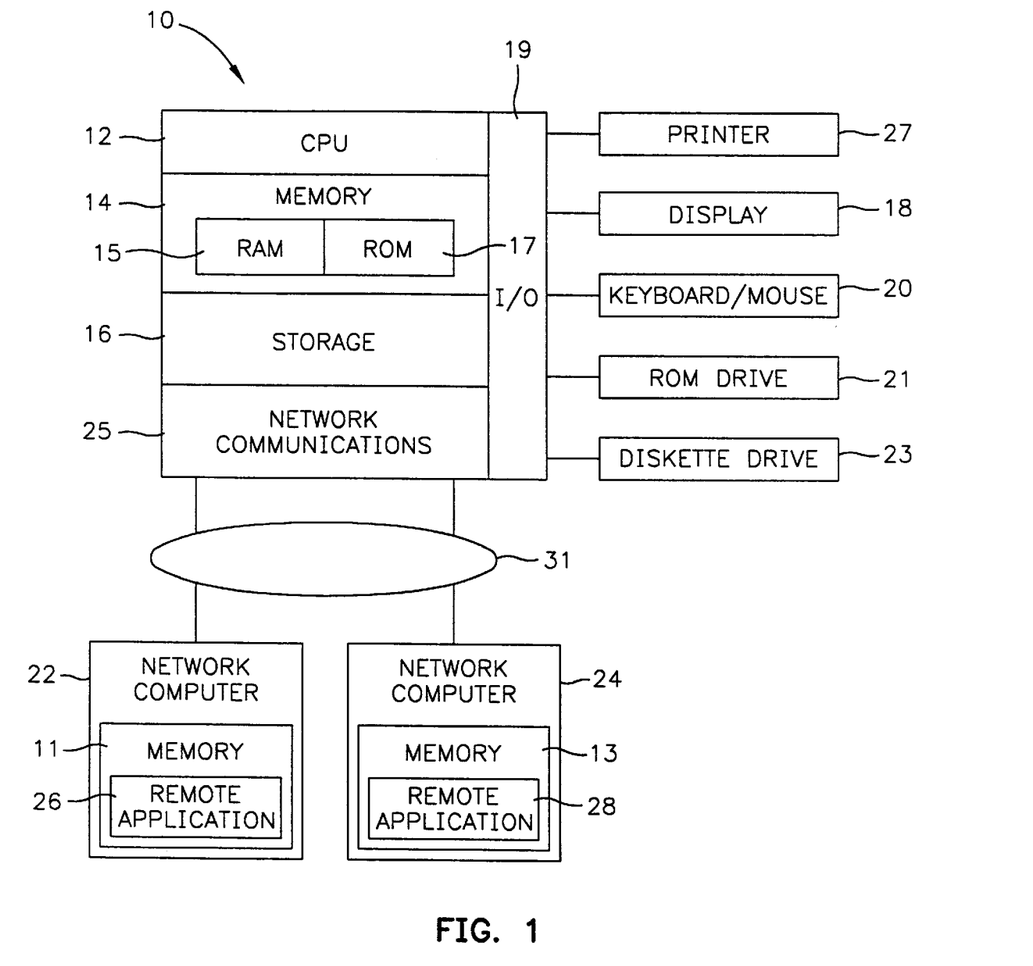
FIG. 1 is a simplified overview of the overall architecture of a computer system in which the present invention is useful.

FIG. 1 shows a simplified overview of the basic architecture of a computer system 10 on which the present invention may be implemented. Computer system 10 may be a personal computer such as a well-known IBM PC or larger mid-range computer such as an IBM AS/400. It is envisioned that the present invention is well-suited to be implemented in a network environment on a computer that acts as a server for clients distributed across a network. Nevertheless, the invention may also work equally well in a stand-alone (i.e., non-networked) environment, since it may be implemented to secure application programs which may be remote or on the stand-alone computer. Examples of remote applications include applications 26 and 28 in memory 11 and 13 of network computers 22 and 24, respectively that communicate with computer system 10 through a network communications interface 25 across a network bus 31. Network bus 31 may be of any topology (e.g. Ethernet or token ring) with any type of transmission media (e.g. fiber optic or copper) and may represent a wide area or local area network, or other computer network including the Internet or an intranet.

Figure 2:
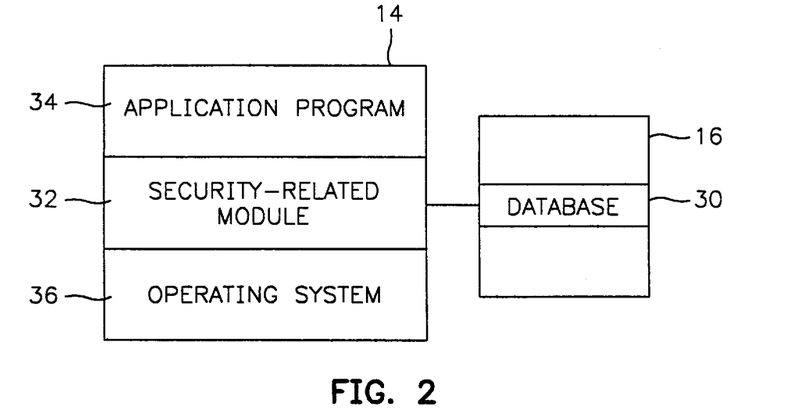
FIG. 2 is a simplified block-diagram of components of the computer system shown in FIG. 1, including hardware and software, that cooperate with the security-related module of this invention for providing security to application programs.

Referring to FIGS. 1 and 2, notwithstanding the ability of the present invention to be implemented in a networked environment, for the sake of simplicity, the invention will be described in terms of a stand-alone computer with both the security-related module 32 of this invention and the application program 34 which it protects operating on the same computer 10. Nevertheless, it should be understood that application program 34 could be interchanged with remote application programs 26 without deviating from the teachings of this invention. The security-related module 32 and the modules that comprise it, described below, are data structures and computer-executable information, including but not limited to computer-executable code.

Computer system 10 includes a central processing unit or CPU 12 that is the "brains" or "engine" of the computer responsible for overseeing all execution of operations in the computer. CPU 12 may be a microprocessor such as the type manufactured by IBM, Intel or Motorola. The computer includes main memory 14 including random access memory (RAM) 15 and read only memory (ROM) 17, and storage 16. While the main memory is shown as a single entity, it should be understood that memory 14, including RAM 15, may exist at multiple levels, from high-speed registers and caches to lower speed but larger DRAM chips. In the preferred embodiment, storage 16 is disk storage, sometimes referred to as a hard disk drive, and although shown as a single entity may in fact comprise a plurality of storage devices.

A conventional display 18 and keyboard and/or mouse 20 are provided for facilitating user communications input/output I/O port 19. A ROM-media drive 21 and diskette disk drive 23 allow reading of computer-executable information through the I/O port. A printer 27 is a resource that is part of computer system 10 should be available to some users, but not to others (e.g. a check-writing printer).

Referring to FIG. 2, the security-related module 32 of this invention is preferably an aggregation of modules that allows the method of this invention to be implemented on the computer 10. Thus, in a preferred embodiment, the module 32 is loaded into main memory 14, preferably in RAM 15, for cooperation with security-related data stored in database 30 of disk storage 16, and for securing tasks performed by application program 34, also loaded in main memory 14. It should be understood that operation of this invention could occur in memory of a network computer, such as memory 11 or 13, but for the sake of simplicity, reference is made in this explanation only to memory 14. The operating system 36 controls interaction of the application programs with underlying hardware, including CPU 12, and with other software on computer 10. The operating system may be for example OS/400 on a larger computer, such as an AS/400 and OS/2 or Windows on a PC.

Object-oriented Environment Implementation

Figure 3:
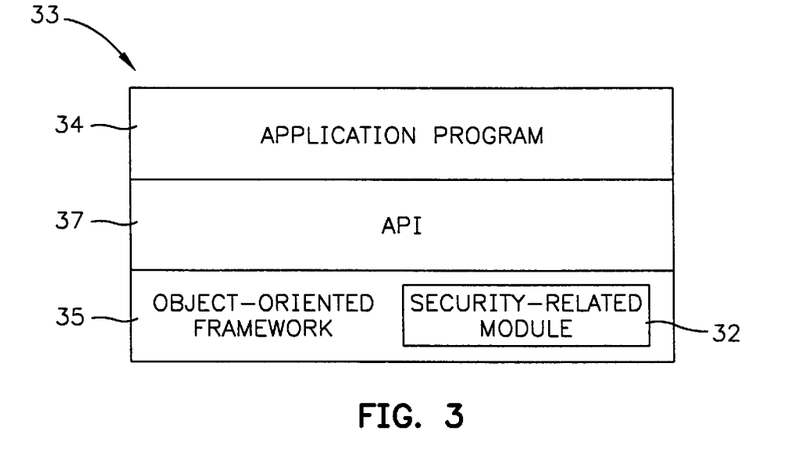
FIG. 3 is a simplified block-diagram of an object-oriented environment in which the security-related module of FIG. 2 is useful for providing security to application programs.

Referring to FIG. 3, the security-related module 32 of the present invention may also operate in an object-oriented environment 33 through an application program interface (API) 37 that is part of framework 35. Frameworks in object-oriented environments are well-known. For example, *The Essential Distributed Objects Survival Guide* by Robert Orfali, Dan Harkey, and Jeri Edwards describe frameworks that communicate through API's with application programs. For the sake of clarity, frameworks are now briefly described. Broadly speaking, frameworks are preassembled class libraries to provide specific function. In general a framework provides an organized environment for running a collection of objects. The framework dictates the architecture of the application by taking care of structure requirements, flow of execution, and calls to system-level API libraries. A framework is an underlying fully debugged software subsystem that can be customized to create an application. The present invention in one embodiment, and as described below, may operate with the framework to provide and interact with objects or resources in the object-oriented environment.

Overview of Operation of the Invention

A security-related task gate is essentially a computer-executable module, preferably implemented as software or program code inserted into a predetermined location in a particular application or computer program that protects the code that would normally be executed following the processing of code located in the vicinity of the gate. In one preferred embodiment, the gate would invoke a subroutine call to a function provided by the application framework. In another embodiment, in an object-oriented environment, the gate would invoke a method call on a framework security-related object. When an executing application encounters a gate, a subroutine or method determines whether the user running the code is allowed to further operate all or a portion of the code. Preferably, an application programmer may insert gates before any code that might contain sensitive information or when executed may perform a function that is not intended for general use.

Preferably, the gates are inserted before the code that is to be protected, so that the gate must be navigated before the code "behind" it may be executed. An advantage of the present invention is that gates may be nested within each other or otherwise overlapped to impart a significant resolution of protection with predictable results.

Various embodiments of the invention are provided, depending on the level of protection desired. Each is now described in overview fashion, and more detail is provided below. A first type of gate, referred to as a "simple" gate, simply protects the function available by executing the code located behind the gate by executing a security function to allow only authorized users to pass and thus execute the function. A second type of gate, referred to as a "control" gate performs the same type of security function as the simple gate to block unauthorized users, but also controls what kind of "object" or resource is available for use once the user has passed the gate. For example, the printer 27 (FIG. 1), which may be a check-writing printer, may be made available while a user is executing the code protected by the gate, but access to the resource is surrendered once the task is complete.

A third type of gate checks authority to execute the application program task protected by the gate, but also "boosts" the users authority while he or she is executing the task, and accordingly, the third gate is denominated as a "booster gate." For example, one entering the gate may have only "read" authority to certain payroll records, but when given special permission that is associated with the gate through data in database 30 the user may "write" data or modify the records until the task is completed. The types of gates described, simple, control, and booster, are merely examples of gates that may be created in view of the teachings of this invention and are not intended to limit the scope of this invention.

Task gates are good tools for accountability because they can be used to audit who passes through such a gate. Moreover, it can easily be assessed what task was performed by a user passing such a gate.

Computer-Related Modules for Implementing the Invention

Figure 4:
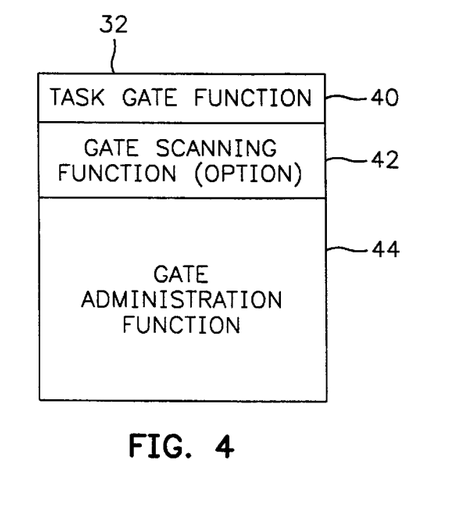
FIG. 4 shows computer-executable security-related modules that comprise the security logic module of FIG. 2.
Figure 5:
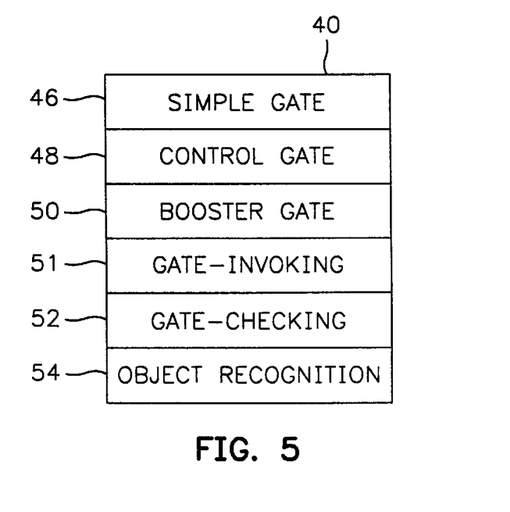
FIG. 5 show modules that comprise the task gate module of FIG. 4 which is part of the security-related module of FIG. 2.

Referring to FIGS. 4 and 5, the security-related module 32 includes a task gate module 40, an optional gate scanning module 42, and a gate administration module 44. Modules 40, 42, and 44 provide the function for which they are named. The task gate module 40 includes logic for enabling a programmer to create logic or software gates to secure tasks that would otherwise be fully executable without restriction as part of application program 34. For example, the programmer may create a simple gate with simple gate module 46, a control gate with control gate module 48, and a booster gate with booster gate module 50. The gates are preferably program code implemented before (relative to the flow of execution and typically literally in a body of program code) code that performs a task or allows access to a resource in which the administrator desires protection. It will be clear to one skilled in the art of object-oriented programming that the data structures and protocols implemented to create gates themselves may be encapsulated as objects, and the object methods may be invoked rather than the code that defines the gate, as an alternative embodiment. In such a case an object-oriented gate module 54 may be provided optionally with task gate module 32. The task gate module 40 also includes a gate-invoking module 51 and a gate-checking module 52 that is responsive to invoking the task gate to determine whether the security-authorizations specified by the gate are met by a user attempting to execute the application program, respectively.

The gate scanning module 42 is an optional portion of computer-executable logic, preferably implemented in program code, that scans the application code to determine where gates are located in the application code. Since this will not always be feasible, for example, source code may not be available, a gate administration module 44 is provided that allows the programmer to list where all gates are located and then place this information in database 30 so that an administrator can retrieve them.

Figure 6:
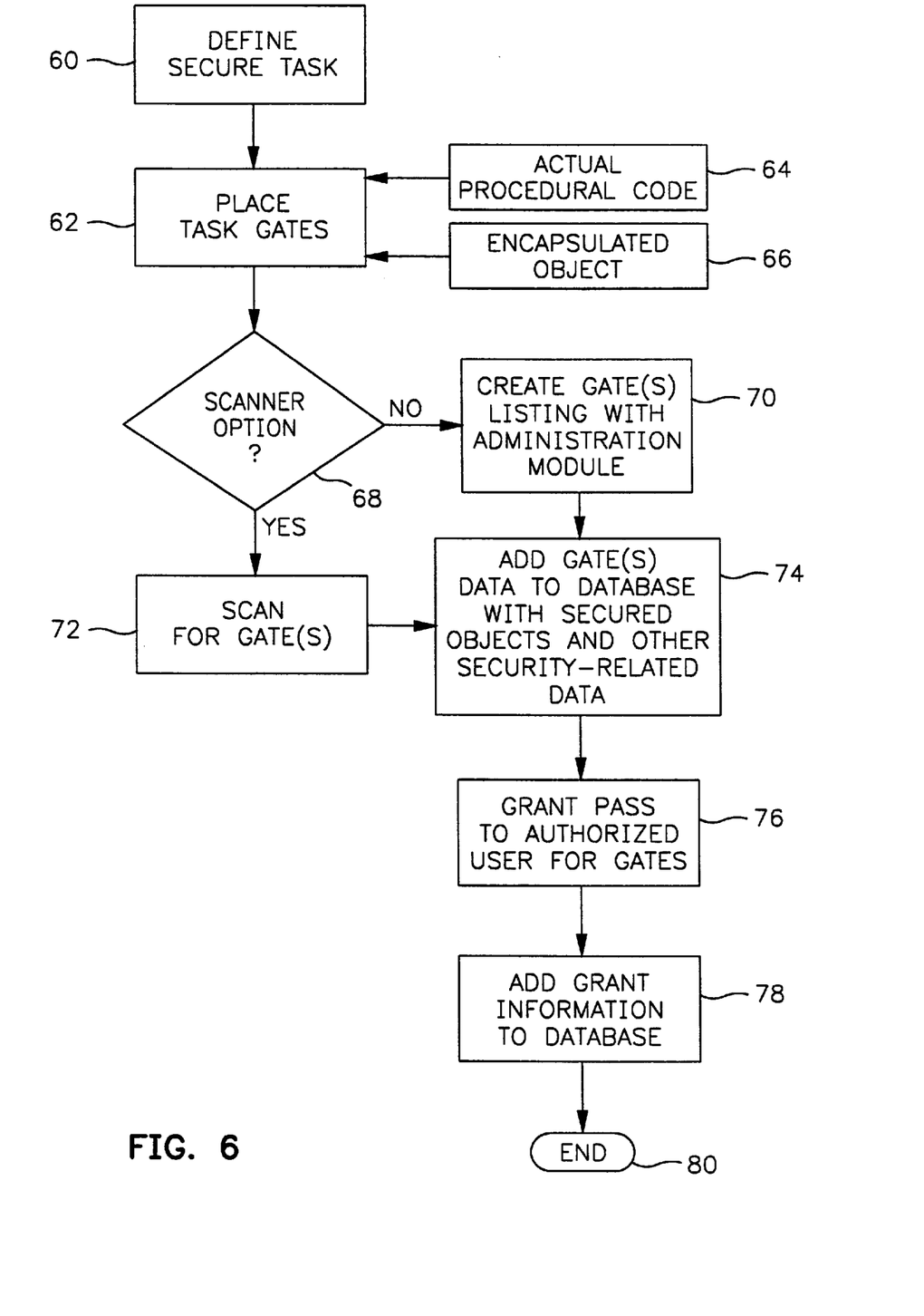
FIGS. 6 and 7 are flow diagrams showing the method of implementing the security-related logic module in the computer system of FIG. 1.
Figure 7:
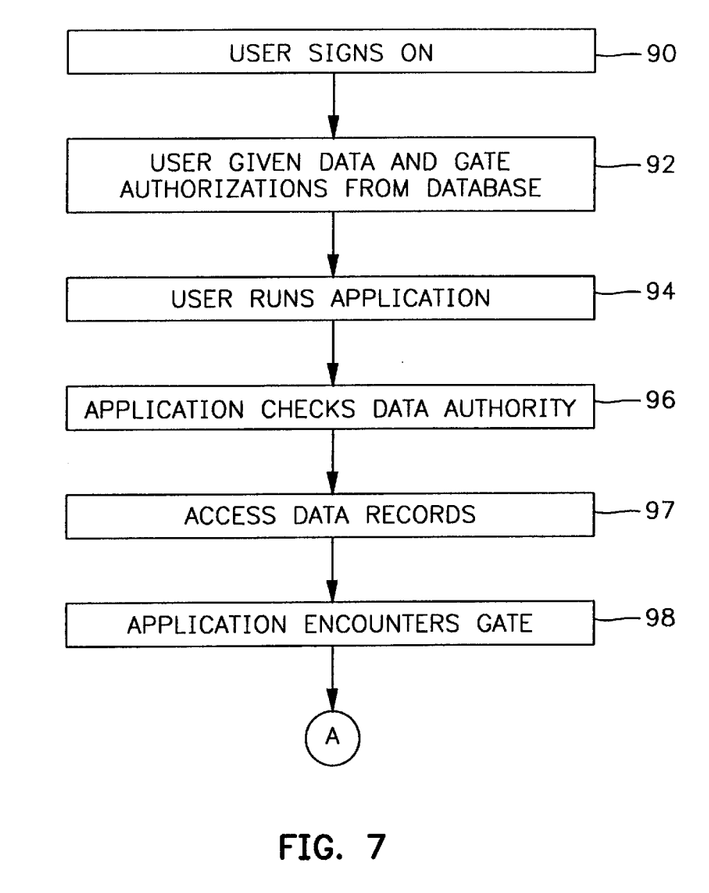

Referring to FIGS. 6 and 7, flow diagrams showing the method of implementing the security-related module in the computer system of FIG. 1 are now described. In step 60, a programmer defines a task to be secured in the application code. In step 62, the programmer places task gates before the task to be secured. If actual code is being placed, then step 64 is performed. Otherwise, in step 66, an object encapsulating the gate information is created and the methods and placed at the proper location in application program 34.

Table 1 shown below, gives an example of a gate placed in an application program in accordance with step 62. The gate shown is not encapsulated in an object, but one skilled in the art, will recognize that the pseudo-code given could be used to create such an object. An advantage of using one or more objects is that those could be placed in the code that causes the computer system to perform a method on the object. This might be advantageous for supporting international use of application software employing the gates of this invention, whereas code language and particularly descriptions written in English, for example, might be unacceptable in Germany, particular if German programmers must maintain the application. Another advantage of using objects is that it allows the same task object to be used in multiple places where similar tasks are being performed.

TABLE 1 salptr = salrecord[15]; // sets salptr to the salary record we want to update
* * *//The following booster gate will chck that the ser can pass through the gate named SAL + 07 while having READ authority to the salary record pointed to by salptr. If the check is successful, the user will be given WRITE authority to that record until the SAL + 07 end gate is encounterd.//* * *
booster_gate(Name = SAL + 07), Auth = (salptr, READ, Give = (salptr, WRITE),
Description = "Allow Salary Increase of 7% for immediate reports");
salptr->salary := salptr->salory * 1.07: //increase current salary by 7%
Write(salptr)://Write out the new salary record
end_gate(NAME = SAL + 07(; //ends this secure task
. . . rest of the application code The above shown psuedocode, combined with the flow diagram will enable one skilled in the art to make and use this invention. The psuedocode shown, closely resembles PASCAL, but one skilled in the art will recognize that the teachings are applicable to C++ or JAVA program code, which is particularly well suited to an object-oriented environment. In this example, a pointer "salptr" points to a record having information that is to be updated. The particular task gate of this example is a booster gate. Accordingly, booster_gate must be passed variable values that indicate the user trying to execute the secure task, which increases the salary 7% is authorized. Thus, SAL+07 is the name of the secured task for which authority for the resource brought in, the file "salrecord(15)" must be at least READ authority (i.e., view), to continue executing the secure task. If this condition is met, then the user is given additional authority (i.e, Give=(salptr, WRITE)) to write (i.e., modify) to the file salrecord(15) to increase its value by 7%. The command "Write(salptr)" writing the increased salary is the heart of the task requiring security to prevent unauthorized increases. This task is bounded at entry by a booster gate, which in this example includes control gate function (by passing in the file resource for operation with the task of writing the file), and which always includes simple gate function, i.e. determining authority to proceed. Because it is a booster gate, which means it boosts or adds authority, it must be bounded at exit by an end gate which takes away the boosted authority once the task is complete. Accordingly, the secure task ends with the statement, end_gate.

Returning to the flow diagram shown in FIG. 6, step 68 checks to see if the optional gate scanning module 42 is being used. If not, the programmer creates gate listing with the administration module 44 and adds them to database 30, in step 74. If so, the scanning module scans the application program code for gates and adds them to database 30, in step 74, rather than having the programmer insert them directly.

The administrator must grant the property authority for the user in association with the gate in step 76 and the information is included in the security database 30 in step 80.

Table 2, shown now, is an example of security information included in database 30, as the result of processing step 74.

TABLE 2

Permissions/Authority

Security Data Base

DATA:

SALARY-Bill(Alice/READ)
SALARY-Fred(Alice/READ)
SALARY-John(Alice/READ)
GATES:

SAL + 07 (Alice/PASS)
Requires READ to SALARY
"Allows salary increase of 7% for immediate reports"

According to this permissions/authority table, Alice has READ permission for the respective salary records of Bill, Fred, and John (i.e, for example, "SALARY-Bill(Alice/READ)" indicates this for Bill's salary record). Additionally, the table reflects that the administrator has given PASS authority to Alice that will allow her to proceed past the security-related task gate "SAL+07"

Figure 8:
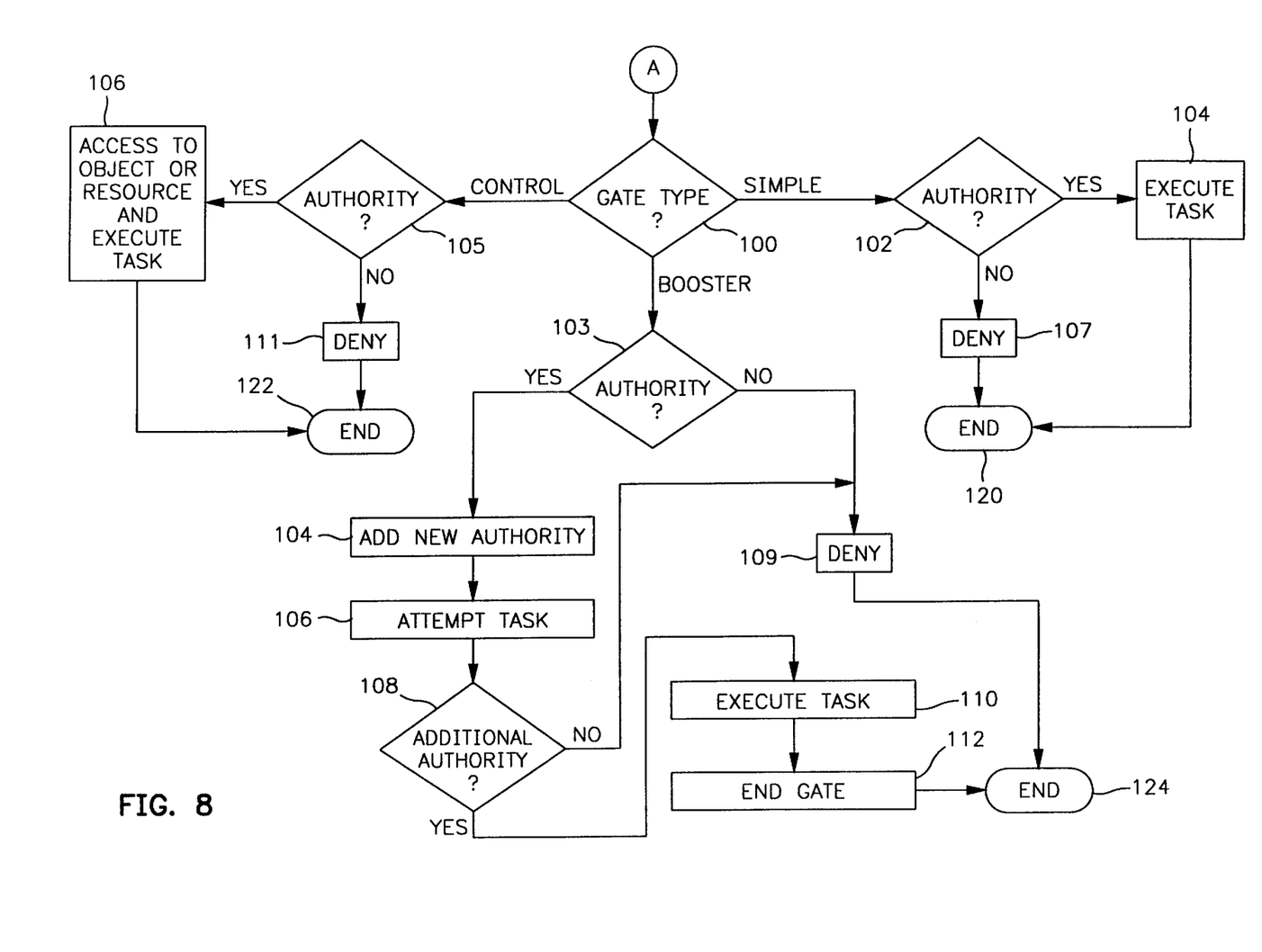
FIG. 8 is a flow diagram showing the method of executing the security logic module implemented in the flow diagrams of FIGS. 6 and 7.

Referring to FIGS. 7 and 8, the cooperation of the gates implemented in the method steps described with reference to FIG. 6 is now described. Execution begins when the user signs on, in step 90, and the user is given normal data authority from the data base. For example, using the examples of Tables 1 and 2, Alice signs on to the system and is given her normal authorities from the Security Database, which allow her to read the salary record's of Bill, Fred, and John. Next the user, Alice, runs an application. Following the example, Alice runs the application program 34 in order to grant her subordinate Fred a 7% increase in salary. The security module checks data authority, in step 96, to make sure that Alice is cleared to read Fred's salary record. Then the application accesses the requested record, in step 97. The Application encounters a gate, in step 98, and the security-related gate is invoked. Connector step "A" continues the flow diagram to FIG. 8 discussed below.

In step 100, the gate type is checked by the security-related module 32. If it is a simple gate, authority is checked in step 102. If the user does not have authority to execute the task, permission is denied in step 107 and processing ends in step 120. If the user does have authority, he or she is allowed past the gate and the application executes the task in step 104 and processing ends in step 120. If the gate is a control gate, authority to pass the gate and execute the guarded task is checked in step 105. If the user does not have authority to pass the gate and execute the task, permission is denied in step 111 and processing ends in step 122. If the user does have authority, he or she is allowed past the gate in step 106 and in addition is granted control of any objects or resources needed for executing the task. For example, the user may be allowed to print checks at the printer 27, for the limited period while executing the task in step 121. Processing ends in that case in step 122.

If the gate is a booster gate, the authority to pass the gate is checked in step 103, and if not available, access is denied in step 109 and processing ends in step 124. In step 104, if authority for the gate is given and appears in the database, the user passes the gate and new authority is granted. Table 3 shown below includes information related to the example of Alice, Bill, Fred, and John and the salary records given above and continued below to explain booster gates.

TABLE 3

Alice's Authority
Normal

READ:
    SALARY-Bill
    SALARY-Fred
    SALARY-John
PASS:
    GATE-SAL + 07
    Boosed by SAL + 07

WRITE:
    SALARY-Fred

The above information, written into and read from database 30 indicates that Alice may read the salary records of her subordinates, Bill, Fred, and John, she may pass the gate "SAL+07" with boosted authority by that gate write the salary of Fred.

Referring again to FIG. 8, and continuing the example from above, the application encounters the booster gate for SAL+07 which determined whether Alice has READ authority to view Fred's salary record and also has PASS authority to go past gate SAL+07 (step 103). Because Alice successfully passed the gate, WRITE authority to Fred's salary record is added for completion of the task (step 104). Generally, the processing of steps 106 and 108 are completed next, wherein the application task is attempted by the user and additional authority is checked by the security module in respective order. If the authority does not exist, then processing continues to step 109 (denial) and ends in step 124. If the correct authority (in this case "WRITE" authority) is given then the additional authority task is completed in step 110. For example, when the application tries to write Fred's updated salary record the module checks that Alice has WRITE access to it and allows her to WRITE the increase to Fred's salary record (step 108). Generally, following execution of the task, the application encounters the end of the gate in step 112 and processing ends in step 124. For example, the end_gate statement shown in Table 1, is the end of the SAL+07 gate and it takes away Alice's authority to WRITE Fred's salary record.

Thus, the inventors have provided a mechanism for delimiting precisely where a user has authority to execute a task, or even use a resource. Only when the user is operating within the computer program, at a specific location defining a computer-executable task, bounded at least at entry by a task gate, does the user have permission to execute the code which may involve accessing, or modifying otherwise off limits files and resources, such as printers. Thus, the invention provides the advantage of delimiting exactly what a user can and can't do while running an application without giving them anymore authority than they need for the task and none when they are not involved with executing the task. This is a significant advantage over the prior art, where a user might be given authority to access a file or use a printer at system definition, and would retain such authority until a administrator changed it. With the present invention, the user needs to be running a specific application or program code and must be given authority within that application by a task gate at the point where such a file or resource is involved with a computer-executable task secured by the gate. For example, this would prevent Alice from giving arbitrary raises without specific authority to do so at the appropriate time.

As described above, aspects of the present invention pertain to specific method steps implementable on computer systems. In an alternative embodiment, the invention may be implemented as a computer program-product for use with a computer system. The programs defining the functions of the present invention can be delivered to a computer via a variety of signal-bearing media, which may be recordable-type media and transmission-type media. Examples of recordable-type media include, but are not limited to: (a) information permanently stored on non-writable storage media (e.g., read-only memory devices within a computer, such as ROM 17 or CD-ROM disks readable by ROM Media drive 21); and (b) alterable information stored on writable storage media (e.g., floppy disks within diskette drive 23 or hard drive 16). Examples of transmission-type media include computer, cable, or telephone networks, including wireless communications. Therefore, it should be understood that such signal-bearing media, when carrying computer readable instructions that direct the method functions of the present invention, represent alternative embodiments of the present invention.

Other embodiments and configurations may occur to those skilled in the art in view of these teachings. For example, the logic module may be implemented as hardware or a combination of hardware and software (i.e., firmware), rather than in the preferred embodiment of only software code. Therefore, the spirit and scope of this invention is not to be limited by anything other than the appended claims and their equivalents.

What is claimed is:

1. A method of providing computer-related security, the method comprising the steps of:
    embedding within a body of computer application code, at a location defining a computer-executable task, security-related computer-executable information denominated as a task gate defining user-related security criteria that must be satisfied in order to execute the computer-executable task;
    invoking the task gate responsive to encountering it during execution of the computer application program code; and
    responsive to invoking the task gate determining whether the predetermined security conditions have been met before allowing execution of the computer-executable task.

2. The method of claim 1, wherein the computer application program code executes in an object-oriented environment and the security-related computer-executable information is encapsulated within the method of an object.

3. The method of claim 2, wherein the task gate secures access to an object that may be involved with the execution of the computer-executable task.

4. The method of claim 1, wherein the task gate secures access to a resource that may be involved with execution of the computer-executable task.

5. The method of claim 1, further comprising the step of scanning the computer application program code prior to the step of invoking the task gate to determine the location of the task gate.

6. The method of claim 5, wherein the location and a description of the task gate in computer application program code is added to a database stored in storage following the step of scanning the code.

7. The method of claim 1, wherein the location of the task gate in computer application program code is added to a database stored in storage.

8. The method of claim 1, wherein the security-related information of the task gate contains information that allows a user having security-related authority that satisfies the user-related security criteria to receive additional security-related authority based on the computer-executable task that expires when the computer-executable task is complete.

9. A system comprising:
   a computer having a processing unit coupled with main memory and further coupled with storage;
   a security-related module in main memory and configured for communicating with the processing unit to perform the computer-executed steps of:
      responsive to encountering security-related computer-executable information denominated as a task gate embedded within a computer application program in main-memory, at a location defining a computer-executable task, invoking the task gate, wherein the task gate defines security-related criteria that must be satisfied in order to execute the computer-executable task; and
      responsive to invoking the task gate, determining whether the predetermined security conditions have been met before allowing execution of the computer-executable task.

10. The system of claim 9, wherein the computer application program code executes in an object-oriented environment and the security-related computer-executable information is encapsulated within an object.

11. The system of claim 10, wherein the task gate secures access to an object that may be involved with the execution of the computer-executable task.

12. The system of claim 9, wherein the task gate secures access to a resource that may be involved with execution of the computer-executable task.

13. The system of claim 9, further including a computer application program code scanner for scanning the computer application program code prior to the step of invoking the task gate to determine the location and description of the task gate.

14. The system of claim 13, further including a database stored in fixed storage and wherein the location and description of the task gate in computer application program code is added to a database stored in storage by the code scanner.

15. The system of claim 9, wherein the location and description of the task gate in computer application program code is added to a database stored in storage.

16. The system of claim 9, wherein the security-related information of the task gate contains information that allows a user having security-related authority that satisfies the user-related security criteria to receive additional security-related authority based on the computer-executable task that is only valid until the computer-executable task is complete.

17. An apparatus comprising:
   a processing unit;
   main memory for executing a computer application program that is in communication with the processing unit;
   storage in communication with the processing unit and main memory; and
   a security-related module in communication with main memory that invokes a security-related procedure responsive to encountering computer-executable security-related information denominated as a task gate embedded within a computer application program executing in main-memory, at a location defining a computer-executable task, wherein the task gate defines security criteria that must be satisfied in order to execute the computer-executable task.

18. The apparatus of claim 17, wherein the security-related procedure invoked by the security-related module determines whether the predetermined security conditions have been met before allowing execution of the computer-executable task.

19. A program-product for use in a computer system, comprising:
   at least one computer-usable signal-bearing medium carrying thereon:
   a gate-invoking module that is responsive to encountering computer-executable information denominated as a task gate embedded within a computer program in main-memory at a location defining a computer-executable task by invoking the task gate when the gate-invoking module is executed in the computer system wherein the task gate defines security-related criteria that must be satisfied in order to execute the computer-executable task; and
   a gate-checking module that is responsive to the gate-invoking module invoking of the task gate by determining whether the predetermined security conditions have been met before allowing execution of the computer-executable task when the gate-checking module is executed in the computer system.

* * * * *